United States Patent
Chen

(10) Patent No.: US 9,360,721 B2
(45) Date of Patent: Jun. 7, 2016

(54) LIQUID CRYSTAL DISPLAY PANEL

(71) Applicant: Innolux Corporation, Miao-Li County (TW)

(72) Inventor: Chien-Hung Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 130 days.

(21) Appl. No.: 14/160,606

(22) Filed: Jan. 22, 2014

(65) Prior Publication Data

US 2014/0240628 A1    Aug. 28, 2014

(30) Foreign Application Priority Data

Feb. 22, 2013    (TW) ............................... 102106256 A

(51) Int. Cl.
  *G02F 1/1333*    (2006.01)
  *G02F 1/1362*    (2006.01)
  *G02F 1/136*     (2006.01)

(52) U.S. Cl.
  CPC .... *G02F 1/136209* (2013.01); *G02F 1/133345* (2013.01); *G02F 1/136286* (2013.01); *G02F 2001/13606* (2013.01); *G02F 2001/136222* (2013.01)

(58) Field of Classification Search
  CPC ................ G02F 1/136209; G02F 1/133345; G02F 1/136286; G02F 2001/136222; G02F 2001/13606
  See application file for complete search history.

(56) References Cited

U.S. PATENT DOCUMENTS

2010/0053050 A1*  3/2010  Tsubata et al. ................... 345/87
2014/0104527 A1*  4/2014  Yang et al. ........................ 349/43

* cited by examiner

*Primary Examiner* — Michael Caley
*Assistant Examiner* — Adam C Chen
(74) *Attorney, Agent, or Firm* — McClure, Qualey & Rodack, LLP

(57) ABSTRACT

A liquid crystal display (LCD) panel comprising a signal line, a first dielectric layer, a liquid crystal layer, a pixel electrode, and a thin film transistor (TFT) is provided. The first dielectric layer with a first permittivity $\in 1$ is formed on the signal line and the TFT. An average permittivity of the liquid crystal layer is a second permittivity $\in 2$ greater than the first permittivity $\in 1$. The pixel electrode neighbors with the signal line. The distance between the signal line and a side of the first dielectric layer is a first distance d1, and the distance between a side of the first dielectric layer and a side of the pixel electrode is a second distance d2, wherein the second permittivity $\in 2$, the first permittivity $\in 1$, the first distance d1 and the second distance d2 are conformed to the following inequality:

$$\left(\frac{1}{\frac{\varepsilon 1}{\varepsilon 2} \times \frac{d2}{d1} + 1}\right) \times \varepsilon 2 < \frac{Vth}{Vd}.$$

10 Claims, 4 Drawing Sheets

LIQUID CRYSTAL DISPLAY PANEL

This application claims the benefit of Taiwan application Serial No. 102106256, filed Feb. 22, 2013, the subject matter of which is incorporated herein by reference.

BACKGROUND OF THE INVENTION

1. Field of the Invention

The invention relates in general to a display panel, and more particularly to a liquid crystal display (LCD) panel.

2. Description of the Related Art

In recent years, liquid crystal display (LCD) panel has been widely used in display screen of electronic products. The LCD panel has many different implementations such as twister nematic (TN) display, super twisted nematic (STN) display, in-plane switching (IPS) display, and multi-domain vertical alignment (MVA) display. A vertical electrical field or a horizontal electrical field can be applied to the LCD panel for controlling the rotation direction of liquid crystal molecules and adjusting the polarizing direction of the light. Consequentially, light flux is affected and contrast effect of bright state and dark state can be achieved.

The LCD panel comprises a plurality of pixel regions. Each of the pixel regions can be divided into a non-opening area and an opening area. The non-opening area, defined as the area outside the opening area, has a thin film transistor (TFT) and a plurality of signal traces. The black matrix (BM) of conventional LCD panel is disposed in the non-opening area. The size of the black matrix is equivalent to the non-opening area such that the light will not be leaked via the non-opening area. However, the design of the black matrix and the non-opening area having equivalent size deteriorates aperture ratio, increase manufacturing cost, and accordingly jeopardize market competitiveness.

SUMMARY OF THE INVENTION

The invention is directed to a liquid crystal display (LCD) panel whose black matrix only needs to be disposed in a transistor area of a pixel region and does not need to be extended to a non-transistor area, hence increasing aperture ratio, reducing the manufacturing cost, and accordingly enhancing market competitiveness.

According to one embodiment of the present invention, a liquid crystal display (LCD) panel comprising a signal line, a first dielectric layer, a liquid crystal layer, a pixel electrode, and a thin film transistor (TFT) is provided. The first dielectric layer has a first permittivity $\in 1$ is formed on the signal line and the TFT. An average permittivity of the liquid crystal layer is the second permittivity $\in 2$, wherein the second permittivity $\in 2$ is greater than the first permittivity $\in 1$. The pixel electrode neighbors with the signal line. The distance between the signal line and a side of the first dielectric layer is a first distance d1, and the distance between a side of the first dielectric layer and a side of the pixel electrode is a second distance d2. The second permittivity $\in 2$, the first permittivity $\in 1$, the first distance d1 and the second distance d2 are conformed to the following inequality:

$$\left(\frac{1}{\frac{\varepsilon 1}{\varepsilon 2} \times \frac{d2}{d1} + 1}\right) \times \varepsilon 2 < \frac{Vth}{Vd}.$$

The threshold voltage Vth is a threshold voltage making the transmittance of the liquid crystal layer start to increase. The Vd is a driving voltage making the transmittance of the LCD panel reach a maximum transmittance if the signal line is a data line, and the Vd is a voltage difference between VGL and the pixel electrode if the signal line is a scan line. The VGL is a gate low voltage of the scan line and a transmittance of a region between the signal line and the side of the pixel electrode is less than 0.1% and more than 0%.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
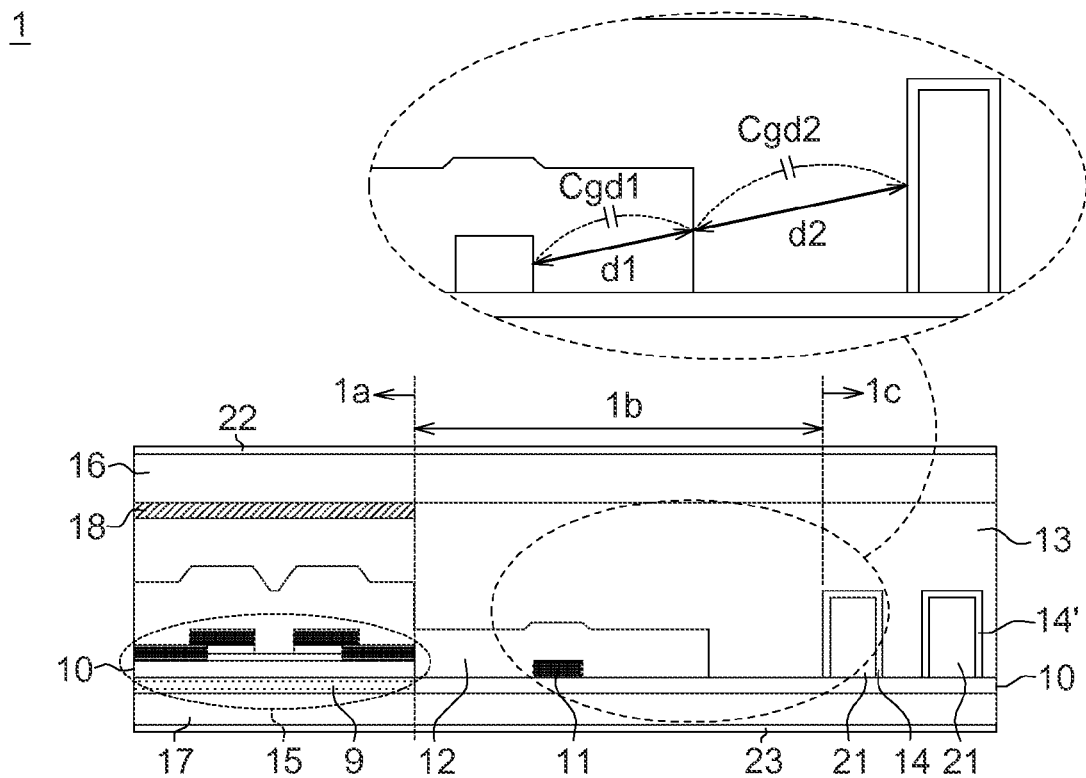
FIG. 1 is a cross-sectional view of an LCD panel.
Figure 2:
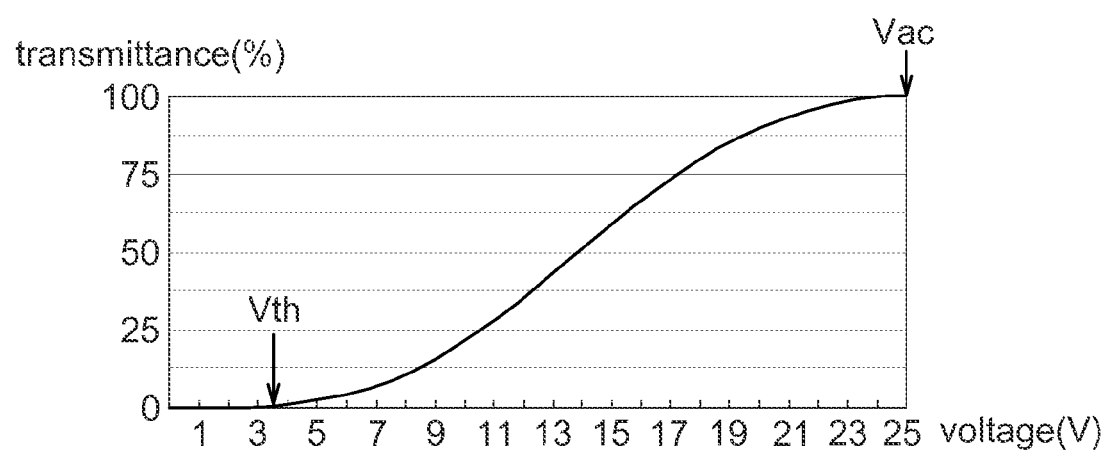
FIG. 2 is a schematic diagram illustrating transmittance varying with voltage.

Referring to FIG. 1 and FIG. 2 at the same time. FIG. 1 is a cross-sectional view of an LCD panel. FIG. 2 is a schematic diagram illustrating transmittance varying with voltage. The LCD panel 1 comprises a metal layer 9, a protection layer 10, a signal line 11, a first dielectric layer 12, a liquid crystal layer 13, a pixel electrode 14, a pixel electrode 14', a thin film transistor (TFT) 15, a first substrate 16, a second substrate 17, a black matrix (BM) 18, a protrusion 21, a polarizer 22 and a polarizer 23. The LCD panel 1 can be divided into a non-opening area and an opening area 1c. The non-opening area further comprises a transistor area 1a and a non-transistor area 1b. The non-transistor area 1b refers to a region between a side of the transistor area 1a and a side of the pixel electrode 14 closest to the transistor area 1a. The non-transistor area 1b is between the transistor area 1a and the opening area 1c.

It should be noted that the transistor area 1a is different from the non-opening area of a conventional LCD panel, and the non-transistor area 1b is different from the opening area of the conventional LCD panel. The non-opening area of the conventional LCD panel must comprise a TFT 15 and a signal line 11. Relatively, the transistor area 1a defined in the LCD panel 1 of the present invention only comprises a TFT 15 but not the signal line 11. The non-transistor area 1b is defined as a region between a side of the TFT 15 and the side of the pixel electrode 14 closest to the signal line 11. The transistor area 1a is less than the non-opening area of the conventional LCD panel.

The black matrix 18 is disposed in the transistor area 1a instead of the non-transistor area 1b. The metal layer 9, the protection layer 10, the signal line 11, the first dielectric layer 12, the liquid crystal layer 13, the pixel electrode 14, the pixel electrode 14', the TFT 15, the black matrix 18 and the protrusion 21 are located between the first substrate 16 and the second substrate 17. The first substrate 16 and the second substrate 17 are located between the polarizer 22 and the polarizer 23. The first dielectric layer 12 is formed on the signal line 11 and the TFT 15. The first dielectric layer 12 is a transparent material, and can be realized by such as an insulating layer, a color filter or a combination thereof. The first dielectric layer 12 has a first permittivity $\in 1$. The first permittivity $\in 1$ is greater than 0 and less than or equal to 10.

The first substrate 16 and the second substrate 17 are formed by a transparent material, and the transparency of the first substrate 16 and the second substrate 17 is above 90%. When the first dielectric layer 12 is realized by an insulating layer formed by a transparent material, the transparency of the first dielectric layer 12 is above 90%. When the first dielectric layer 12 is realized by a color filter, the first dielectric layer 12 still allows a light with a specific waveband to pass through. The transparency of the color filter is about ⅓ of that of the insulating layer.

The protrusion 21 and the first dielectric layer 12 can be formed by the same or different materials. Besides, the protrusion 21 and the first dielectric layer 12 can be formed in the same manufacturing process or separate processes. Moreover, the shape of the protrusion 21 can be semi-circular, polygonal or other shapes, and the invention is not limited thereto. Furthermore, the protrusions 21 can have the same or different heights.

The metal layer 9 is formed on the second substrate 17. The protection layer 10 is formed on the metal layer 9 in the transistor area 1a, and is formed on the second substrate 17 in the non-transistor area 1b and the opening area 1c. The liquid crystal layer 13 is formed on the first dielectric layer 12 and located between the first substrate 16 and the second substrate 17. The liquid crystal layer 13 is driven by such as a horizontal electrical field or a vertical electrical field. When the liquid crystal layer 13 is driven by the vertical electrical field, the first substrate 16 can have an electrode layer (not illustrated). The electrode layer, composed of such as full electrodes or patterned electrodes, is formed by a transparent material whose transmittance is above 90%. The liquid crystal layer 13 is formed by a liquid crystal material with a second permittivity. The liquid crystal material is such as a blue phase liquid crystal, other liquid crystal with high polar functional group, or a liquid crystal containing a high proportion of chiral material. The second permittivity $\in 2$ is such as an average permittivity. The liquid crystal is formed by a dielectric anisotropic material whose average permittivity is expressed as the second permittivity $$\varepsilon 2 = \frac{2\varepsilon_\perp + \varepsilon_{//}}{3}.$$

The permittivity $\in_{//}$ represents a permittivity of a long axis of liquid crystal. The permittivity $\in_\perp$ represents a permittivity of a short axis of liquid crystal. The liquid crystal layer 13 has the second permittivity $\in 2$ greater than the first permittivity $\in 1$. The second permittivity $\in 2$ is greater than or equal to 20 and less than or equal to 500. The ratio of the second permittivity $\in 2$ to the first permittivity $\in 1$ is greater than or equal to 5 and less than or equal to 100.

Referring to FIG. 2. FIG. 2 illustrates a relationship of transmittance vs. voltage as a voltage Vd is applied to a liquid crystal layer 13 via a data line. In the present embodiment, the average permittivity of the liquid crystal layer 13 is about 100, and the permittivity of the first dielectric layer 12 is about 5.

The Vth is a threshold voltage when the transmittance of the liquid crystal layer 13 is about 0.1% and more than 0%. When the liquid crystal layer reaches a maximum transmittance, the voltage Vd driving the liquid crystal layer is defined as Vac. In the present embodiment, the threshold voltage Vth and the driving voltage Vd satisfy the condition:

$$0.02 \leq \frac{Vth}{Vd} \leq 0.5.$$

Referring to FIG. 1 again. The pixel electrode 14 neighbors with the signal line 11. The pixel electrode 14 is closer to the signal line 11 than the pixel electrode 14' is. The voltages at the pixel electrode 14 and the pixel electrode 14' can have the same or different electrical potentials. For instance, the pixel electrode 14' is a common voltage, but the pixel electrode 14 is not a common voltage. As indicated in FIG. 1, in comparison to the pixel electrode 14', the pixel electrode 14 is the pixel electrode closest to the signal line 11. The distance between the signal line 11 and a side of the first dielectric layer 12 is d1, and the distance between the side of the first dielectric layer 12 and the side of the pixel electrode 14 is d2. The distance d1 is greater than or equal to 1 μm and less than or equal to 20 μm. The distance between the first dielectric layer 12 and the pixel electrode 14 via the liquid crystal layer 13 is d2. The distance d2 is greater than or equal to 1 μm and less than or equal to 20 μm. A sum of the distance d1 and the distance d2 is greater than or equal to 2 μm and less than or equal to 20 μm. The distance d1 and the distance d2 can be calculated in many different ways. For convenience of elaboration, as indicated in FIG. 1, the distance between a central point of the height of a side of the signal line 11 and a central point of the height of the side of the first dielectric layer 12 is d1, and the distance between a central point of the height of the side of the first dielectric layer 12 and a central point of the height of the side of the pixel electrode 14 is d2.

The first parasitic capacitance Cgd1 is formed between the signal line 11 and the side of the first dielectric layer 12, and the second parasitic capacitance Cgd2 is formed between the side of the first dielectric layer 12 and the side of the pixel electrode 14. The first permittivity $\in 1$, the second permittivity $\in 2$, the first distance d1, the second distance d2, the threshold voltage Vth and the voltage Vd must satisfy the condition $$\left(\frac{1}{\frac{\varepsilon 1}{\varepsilon 2} \times \frac{d2}{d1} + 1}\right) \times \varepsilon 2 < \frac{Vth}{Vd}. \quad \text{(Inequality 1)}$$

(Inequality 1). When the condition of Inequality 1 is conformed, the transmittance of the region between the signal line 11 and the side of the pixel electrode 14 is less than 0.1% and more than 0%. The Vd is a driving voltage Vac making the LCD panel 1 reach the maximum transmittance (FIG. 2) if the signal line 11 is a data line, and is a voltage difference between VGL and the pixel electrode if the signal line 11 is a scan line. The voltage VGL is a gate low voltage of the scan line.

When a voltage difference is formed between the signal line and the pixel electrode, the distribution of voltage difference is dependent on the permittivity of each material layer between the signal line and the pixel electrode. In the present embodiment, since the second permittivity $\in 2$ is greater than the first permittivity $\in 1$, the capacitance of the second parasitic capacitance Cgd2 is greater than the capacitance of the first parasitic capacitance Cgd1, and the voltage difference between two ends of the second parasitic capacitance Cgd2 is far less than the voltage difference between two ends of the first parasitic capacitance Cgd1. This implies that when a voltage difference is formed between the signal line and the pixel electrode, the voltage difference of the second parasitic capacitance Cgd2 will be very small. When the voltage difference between two ends of the second parasitic capacitance Cgd2 is less than the threshold voltage Vth driving the liquid crystal layer 13, the liquid crystal in the non-transistor area 1b will not be driven. Particularly, the liquid crystal layer in a region between a side of the TFT 15 and the side of the pixel electrode 14 closest to the signal line 11 will not be driven, so the light will not be leaked via the liquid crystal layer, and the transmittance of the non-transistor area 1b is less than 0.1% and more than 0%. That is, the liquid crystal layer in the said area does not generate light leakage, so the black matrix 18 only needs to be disposed in the transistor area 1a and does not need to be extended to the non-transistor area 1b. Since the disposition of the black matrix 18 has to consider alignment error, an area for alignment error needs to be added to the disposition area, hence affecting aperture ratio. In the present embodiment, since the black matrix 18 only needs to be disposed in the transistor area 1a, the transistor area 1a is less than the non-opening area. Thus, the disposition area of the black matrix 18 can be smaller, not only saving material but also reducing manufacturing cost. Moreover, the non-transistor area 1b neighbors with the transistor area 1a, and the non-transistor area 1b does not belong to the opening area. The disposition area having considered alignment error is still within the non-transistor area 1b and will not affect the opening area, and aperture ratio can thus be enhanced.

When the LCD panel 1 does not comprise the polarizer 22 and the polarizer 23, there will be no gray level frames for bright state and dark state. Meanwhile, the light can pass through any areas not having a metal trace or a black matrix, and even the color filter allows the light with specific waveband to pass through. Conversely, when the LCD panel 1 comprises the polarizer 22 and the polarizer 23, the polarized light is easily affected by the liquid crystal layer 13 and generates gray level frames for bright state and dark state. Only under such circumstances will there be transmittance changes. The area with the black matrix 18 is impermeable to the light. That is, the transmittance of the area shielded by the black matrix 18 is near 0%. In the area without the black matrix 18 or not shielded by metal traces, each layer on the optical path has high transparency, and the transmittance is mainly dependent on the liquid crystal layer 13.

In the non-transistor area 1b without the black matrix 18, only the part with the signal line 11 is impermeable to the light due to the metal layer shielding the light, and the remaining parts on the optical path are transparent material layers. Therefore, with the use of the polarizer 22 and the polarizer 23, the transmittance of the non-transistor area 1b not shielded by the black matrix 18 is mainly dependent on the liquid crystal layer 13. When the condition of Inequality 1 is conformed, the transmittance is less than 0.1% and more than 0%. That is, the light will not be leaked via the liquid crystal layer 13 in the non-transistor area 1b.

As indicated in FIG. 1, the pixel electrode 14 is formed on the protrusion 21 and goes deep into the liquid crystal layer. Thus, the electrical field can penetrate into the liquid crystal layer 13 to enhance the driving effect. However, practical application is not limited thereto. In other implementations, the pixel electrode 14 may not formed on the protrusion 21. In addition, the black matrix 18 of FIG. 1 neighbors with the underneath of the first substrate 16. However, practical application is not limited thereto. In other implementations, the black matrix 18 may be formed on the TFT 15 and encapsulate the TFT 15.

First Embodiment

Figure 3:
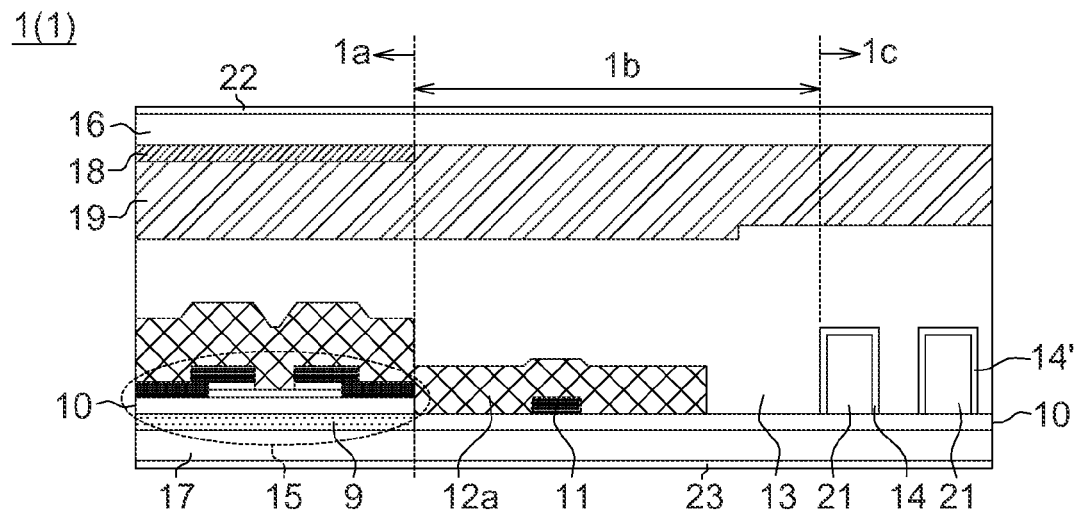
FIG. 3 is a cross-sectional view of an LCD panel according to a first embodiment.

Referring to FIG. 1 and FIG. 3 at the same time, FIG. 3 is a cross-sectional view of according to a first embodiment an LCD panel. In the first embodiment, the LCD panel 1 is exemplified by an LCD panel 1(1), and the first dielectric layer 12 is exemplified by an insulating layer 12a. The LCD panel 1(1) further comprises a color filter 19, and the insulating layer 12a encapsulates the signal line 11 and the TFT 15. The liquid crystal layer 13 is formed on the insulating layer 12a. The color filter 19 is formed on the liquid crystal layer 13. The black matrix 18 is formed on the color filter 19 in the transistor area 1a. When the above condition is conformed, the light will not be leaked via the non-transistor area 1b, that is, the liquid crystal layer in the region between the side of the TFT 15 and the side of the pixel electrode 14 closest to the signal line 11 will be free of light leakage. The transmittance of the non-transistor area 1b is less than 0.1% and more than 0%.

Second Embodiment

Figure 4:
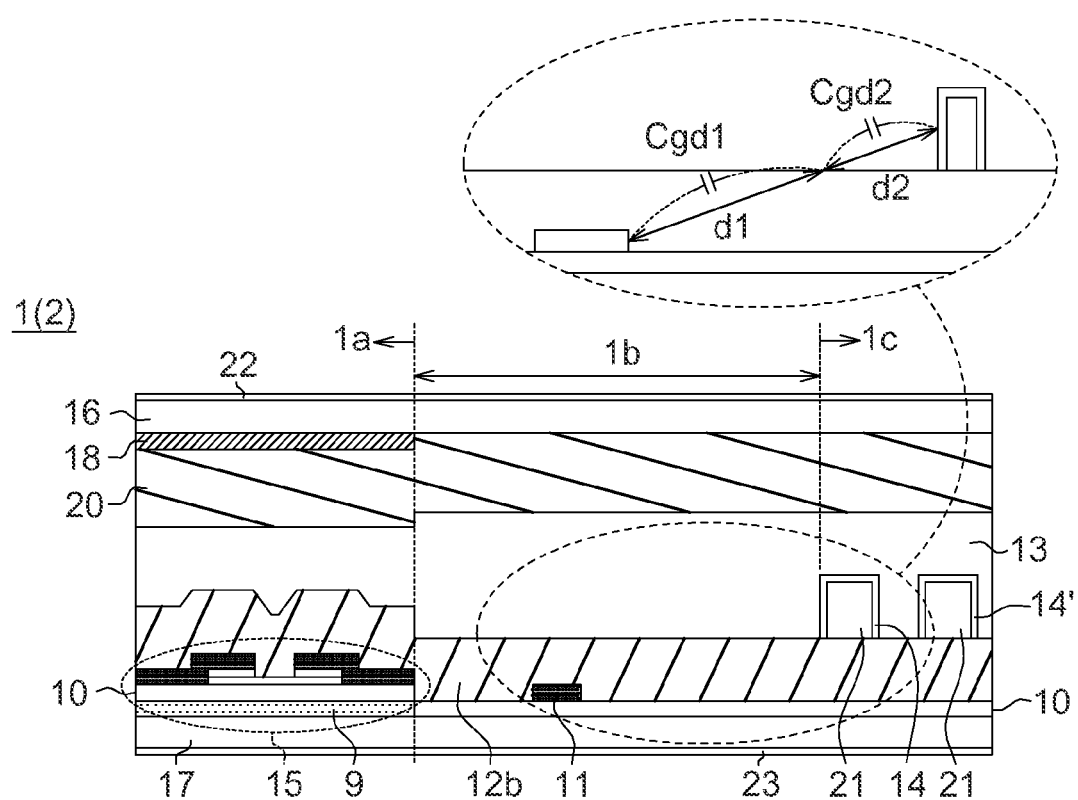
FIG. 4 is a cross-sectional view of an LCD panel according to a second embodiment.

Referring to FIG. 1 and FIG. 4 at the same time. FIG. 4 is a cross-sectional view of according to a second embodiment an LCD panel. In the second embodiment, the LCD panel 1 is exemplified by an LCD panel 1(2), and the first dielectric layer 12 is exemplified by a color filter 12b. The second embodiment and the first embodiment are different mainly in that the LCD panel 1(2) adopts a color filter on array (COA) having a color filter. That is, the color filter 12b is formed above the TFT 15. The LCD panel 1(2) further comprises a planarization layer 20, and the color filter 12b encapsulates the signal line 11 and the TFT 15. The liquid crystal layer 13 is formed on the color filter 12b. The planarization layer 20 is formed on the liquid crystal layer 13. The black matrix 18 is formed on the planarization layer 20 in the transistor area 1a.

In the second embodiment, the first dielectric layer is realized by the color filter 12b, and has a first permittivity $\in 1$. As indicated in FIG. 4, the distance between the central point of the height of the side of the signal line 11 and the central point of the height of the side of the pixel electrode 14 is defined as d1+d2. The distance between the central point of the height of the side of the signal line 11 and the central point of the height of a side of the color filter 12b is a first distance d1, and the distance between the central point of the height of the side of the color filter 12b and the central point of the height of the side of the pixel electrode 14 is a second distance d2.

The first parasitic capacitance Cgd1 is formed between the side of the signal line 11 and the side of the color filter 12b, and the second parasitic capacitance Cgd2 is formed between the side of the pixel electrode 14 and the side of the color filter 12b. In the second embodiment, the first permittivity $\in 1$ of the color filter 12b, the average permittivity of the liquid crystal layer is the second permittivity $\in 2$, the distance d1, the distance d2, the threshold voltage Vth and the voltage Vd must satisfy the condition $$\left(\cfrac{1}{\cfrac{\varepsilon 1}{\varepsilon 2}\times\cfrac{d2}{d1}+1}\right)\times\varepsilon 2<\cfrac{Vth}{Vd}.$$

When a voltage difference is formed between the signal line and the pixel electrode, the distribution of voltage difference is dependent on the permittivity of each material layer between the signal line and the pixel electrode. In the present embodiment, when the condition $$\left(\cfrac{1}{\cfrac{\varepsilon 1}{\varepsilon 2}\times\cfrac{d2}{d1}+1}\right)\times\varepsilon 2<\cfrac{Vth}{Vd}$$

is conformed, the second permittivity ∈2 is greater than the first permittivity ∈1, and the capacitance of the second parasitic capacitance Cgd2 is greater than the capacitance of the first parasitic capacitance Cgd1. This implies that the voltage difference of the second parasitic capacitance Cgd2 will be very small. When the voltage difference between two ends of the second parasitic capacitance Cgd2 is less than the threshold voltage Vth driving the liquid crystal layer 13, the liquid crystal in the non-transistor area 1b will not be driven, so the light will not be leaked via the liquid crystal layer, and the transmittance of the non-transistor area 1b is less than 0.1% and more than 0%. Therefore, the black matrix 18 only needs to be disposed in the transistor area 1a and does not need to be extended to the non-transistor area 1b. Thus, the disposition area of the black matrix 18 can be smaller, not only saving material but also reducing manufacturing cost. The disposition area having considered alignment error is still within the non-transistor area 1b and will not affect the opening area, and aperture ratio can thus be enhanced.

Third Embodiment

Figure 5:
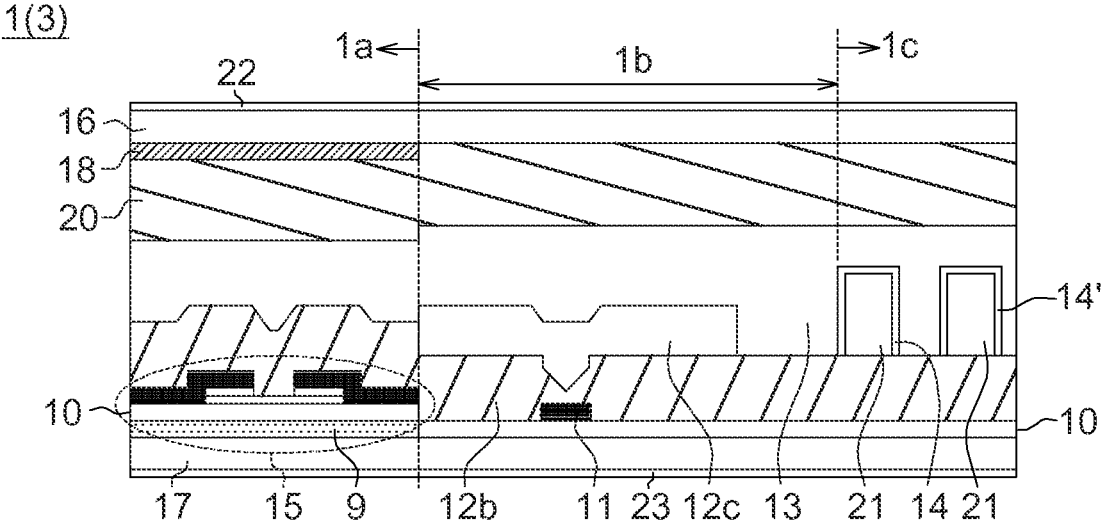
FIG. 5 is a cross-sectional view of an LCD panel according to a third embodiment.

Referring to FIG. 1 and FIG. 5 at the same time, FIG. 5 is a cross-sectional view of according to a third embodiment an LCD panel. In the third embodiment, the first dielectric layer 12 is exemplified by an insulating layer 12c and the color filter 12b. The third embodiment and the second embodiment are different mainly in that the first dielectric layer of the LCD panel 1(3) further comprises an insulating layer 12c formed on a part of the color filter 12b. With the above conditions being conformed, the transmittance of the non-transistor area 1b is less than 0.1% and more than 0%, and the light will not be leaked via the non-transistor area 1b, particularly the liquid crystal layer in a region between the side of the signal line 11 and the side of the pixel electrode 14 closest to the signal line 11.

Fourth Embodiment

Figure 6:
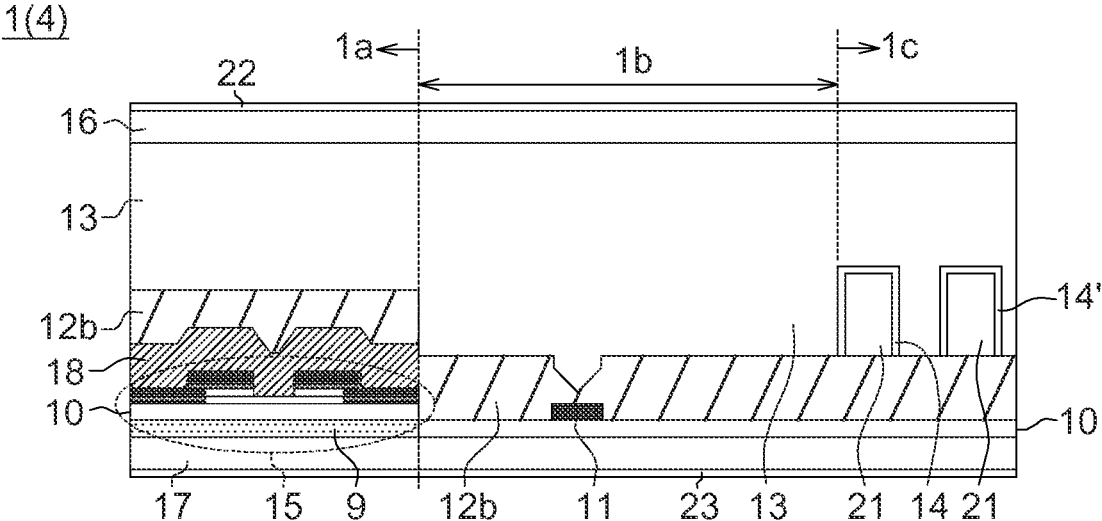
FIG. 6 is a cross-sectional view of an LCD panel according to a fourth embodiment.

Referring to FIG. 1 and FIG. 6 at the same time. FIG. 6 is a cross-sectional view of according to a fourth embodiment an LCD panel. In the fourth embodiment, the LCD panel 1 is exemplified by an LCD panel 1(4). The fourth embodiment and the second embodiment are different mainly in that the LCD panel 1(4) adopts a black matrix on array (BOA). That is, the black matrix 18 is formed above the TFT 15. In the fourth embodiment, the black matrix 18 is located between the color filter 12b and the TFT 15. In other embodiments, the black matrix 18 may be located above the color filter 12b (not illustrated). With the above conditions being conformed, the light will not be leaked via the non-transistor area 1b, particularly the liquid crystal layer in a region between the side of the signal line 11 and the side of the pixel electrode 14 closest to the signal line 11, and the transmittance of the non-transistor area 1b is less than 0.1% and more than 0%.

Fifth Embodiment

Figure 7:
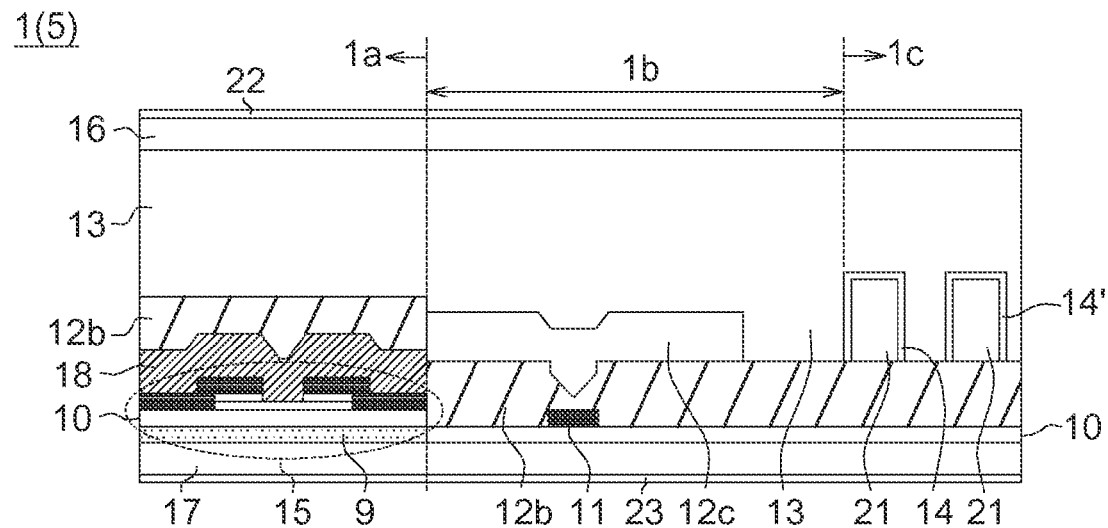
FIG. 7 is a cross-sectional view of an LCD panel according to a fifth embodiment.

Referring to FIG. 1 and FIG. 7 at the same time, FIG. 7 is a cross-sectional view of according to a fifth embodiment an LCD panel. In the fifth embodiment, the LCD panel 1 is exemplified by an LCD panel 1(5). In the fourth embodiment, the first dielectric layer 12 is exemplified by the insulating layer 12c and the color filter 12b. The fifth embodiment and the fourth embodiment are different mainly in that the first dielectric layer of the LCD panel 1(5) further comprises the insulating layer 12c formed on a part of the color filter 12b. The insulating layer 12c and the pixel electrode 14 can be the same or different layers. With the above conditions being conformed, the light will not be leaked via the non-transistor area 1b, particularly the liquid crystal layer in a region between the side of the signal line 11 and the side of the pixel electrode 14 closest to the signal line 11, and the transmittance of the non-transistor area 1b is less than 0.1% and more than 0%.

Sixth Embodiment

Figure 8:
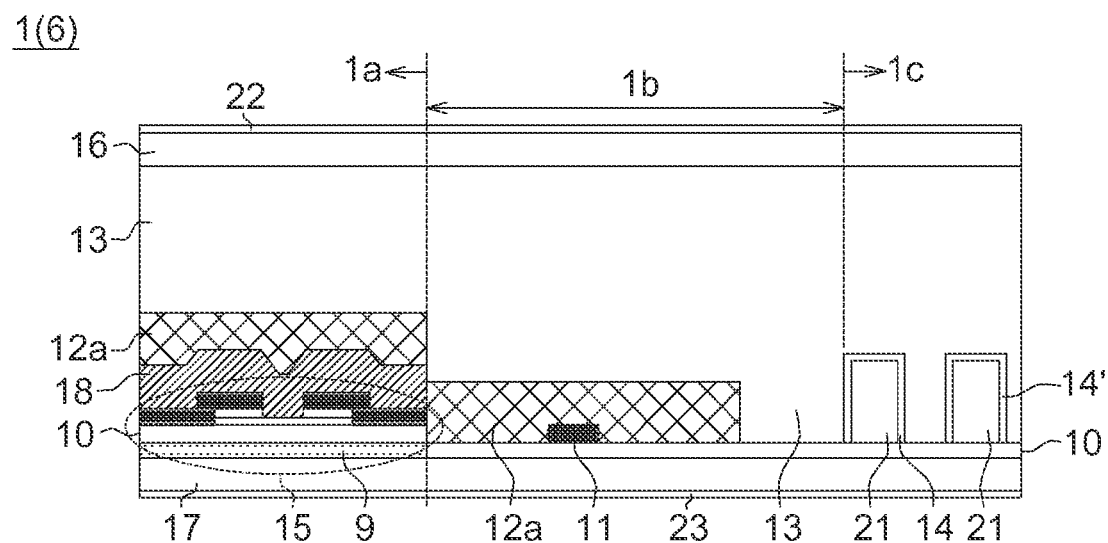
FIG. 8 is a cross-sectional view of an LCD panel according to a sixth embodiment.

Referring to FIG. 1 and FIG. 8 at the same time, FIG. 8 is a cross-sectional view of according to a sixth embodiment an LCD panel. In the sixth embodiment, the LCD panel 1 is exemplified by an LCD panel 1(6), and the first dielectric layer 12 is exemplified by the insulating layer 12a. The sixth embodiment and the fourth embodiment are different mainly in that the first dielectric layer of the LCD panel 1(6) is realized by the insulating layer 12a, not the color filter. In other embodiments, the black matrix 18 can be located above the insulating layer 12a (not illustrated). With the above conditions being conformed, the light will not be leaked via the non-transistor area 1b, particularly the liquid crystal layer in a region between the side of the signal line 11 and the side of the pixel electrode 14 closest to the signal line 11, and the transmittance of the non-transistor area 1b is less than 0.1% and more than 0%.

Since the permittivity of the first dielectric layer of the LCD panel is far less than the average permittivity of the liquid crystal layer, the parasitic capacitance formed by the first dielectric layer is smaller than the parasitic capacitance formed by the liquid crystal layer. Thus, the most of the parasitic capacitance is distributed in the first dielectric layer. That is, the voltage difference of the parasitic capacitance in a region between the side of the signal line 11 and the side of the pixel electrode 14 closest to the signal line 11 is very small and less than the threshold voltage Vth. Thus, the transmittance is less than 0.1% and more than 0%, and the light will not be leaked via the non-transistor area 1b, particularly the liquid crystal layer in a region between the side of the signal line 11 and the side of the pixel electrode 14 closest to the signal line 11. Since the black matrix does not need to be extended to the non-transistor area from the transistor area, and the consideration of alignment error does not affect the opening area, manufacturing cost is reduced and aperture ratio is increased.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
a signal line;
a thin film transistor (TFT);
a first dielectric layer formed on the signal line and the TFT, wherein the first dielectric layer has a first relative permittivity ∈1;
a liquid crystal layer whose average permittivity is a second relative permittivity ∈2, wherein the second relative permittivity ∈2 is greater than the first relative permittivity ∈1; and
a pixel electrode neighboring with the signal line, wherein the distance between the signal line and a side of the first dielectric layer is a first distance d1, and the distance between a side of the first dielectric layer and a side of the pixel electrode is a second distance d2, wherein the second relative permittivity ∈2, the first relative permittivity ∈1, the first distance d1 and the second distance d2 are conformed to the following inequality:

$$\left(\frac{1}{\frac{\varepsilon 1}{\varepsilon 2} \times \frac{d2}{d1} + 1}\right) \times \varepsilon 2 < \frac{Vth}{Vd};$$

wherein, Vth is a threshold voltage making the transmittance of the liquid crystal layer start to increase, and Vd is a driving voltage making the LCD panel reach a maximum transmittance if the signal line is a data line, and the Vd is a voltage difference between VGL and the pixel electrode if the signal line is a scan line, and VGL is a gate low voltage of the scan line and a transmittance of a region between the signal line and the side of the pixel electrode is less than 0.1%.

2. The LCD panel according to claim 1, further comprising:
a black matrix located between the first dielectric layer and the TFT.

3. The LCD panel according to claim 1, wherein the first dielectric layer is a color filter.

4. The LCD panel according to claim 1, wherein the first dielectric layer comprises a color filter and an insulating layer formed on a part of the color filter.

5. The LCD panel according to claim 1, wherein (d1+d2)≥2 μm.

6. The LCD panel according to claim 1, wherein $$5 \leq \frac{\varepsilon 2}{\varepsilon 1} \leq 100.$$

7. The LCD panel according to claim 1, wherein 20≤∈2≤500.

8. The LCD panel according to claim 1, wherein $$0.02 \leq \frac{Vth}{Vd} \leq 0.5.$$

9. The LCD panel according to claim 1, wherein the LCD panel is divided into a non-opening area and an opening area, the non-opening area comprises a transistor area and a non-transistor area, the TFT is disposed in the transistor area, and the non-transistor area is located between the transistor area and the opening area and refers to a region between a side of the transistor area and a side of the pixel electrode.

10. The LCD panel according to claim 9, further comprising a black matrix disposed in the transistor area.

* * * * *